Figure 1:
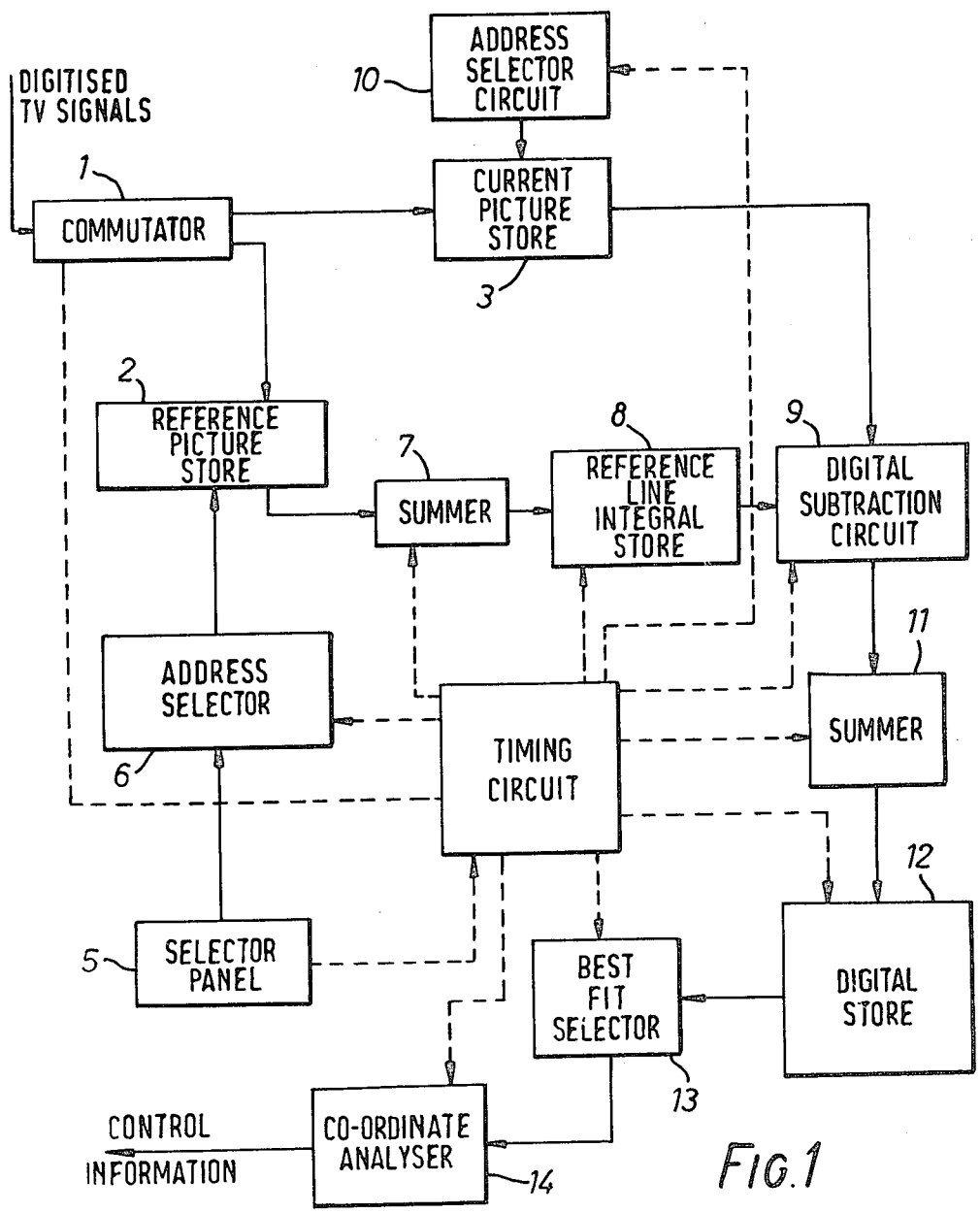

United States Patent [19]

Marsh

[11] 4,164,728
[45] Aug. 14, 1979

[54] CORRELATION TECHNIQUES
[75] Inventor: Robin G. Marsh, Reading, England
[73] Assignee: EMI Limited, Hayes, England
[21] Appl. No.: 859,238
[22] Filed: Dec. 9, 1977
[30] Foreign Application Priority Data
Dec. 11, 1976 [GB] United Kingdom ............... 51809/76
[51] Int. Cl.² ............................................ G06K 9/00
[52] U.S. Cl. .................... 340/146.3 Q; 340/146.3 Y; 343/5 MM; 364/728
[58] Field of Search ................. 340/146.3 Q, 146.3 Y, 340/146.3 S, 5, 146.2; 364/728, 819, 820; 343/5 MM

[56] References Cited
U.S. PATENT DOCUMENTS

| | | | |
|---|---|---|---|
| 3,152,318 | 10/1964 | Swift | 340/146.3 Q |
| 3,165,718 | 1/1965 | Fleisher | 340/146.3 Y |
| 3,299,425 | 1/1967 | Smith et al. | 343/5 MM |
| 3,381,274 | 4/1968 | Quade et al. | 340/146.3 Y |
| 3,748,644 | 7/1973 | Tisdale | 343/5 MM |
| 3,845,466 | 10/1974 | Hong | 340/146.3 S |
| 3,879,727 | 4/1975 | East | 340/146.2 |
| 3,879,728 | 4/1975 | Wolff | 343/5 MM |
| 3,947,833 | 3/1976 | Eckstein, Jr. | 340/146.3 Q |
| 3,952,299 | 4/1976 | Hodge et al. | 340/146.3 Q |
| 4,119,946 | 10/1978 | Taylor | 340/146.2 |

OTHER PUBLICATIONS

Boyle-Bodin et al., "A Letter Encoder After Analysis of Geometrical Characters", *Proc. on Conference on Machine Perception of Patterns: Teddington*, 4-1972, pp. 216-222.

Nakano et al., "Improvement of Chinese Character Rec.", *Proceedings of 1st Int. Joint Conf. on Pattern Rec.*, 1973, pp. 172-178.

Ruppert, "Character Recognition Using Density Sums", *IBM Tech. Disclosure Bulletin*, vol. 18, No. 7, Dec. 1975, pp. 2190-2191.

*Primary Examiner*—Leo H. Boudreau
*Attorney, Agent, or Firm*—Fleit & Jacobson

[57] ABSTRACT

In a correlation system, such as may be used in an autolock follow arrangement, the correlation is effected on the basis of line integrals of data relating to pictures of substantially the same scene obtained at different times. The formation of line integrals allows a straightforward, linear processing technique to be used for the correlation.

8 Claims, 4 Drawing Figures

CORRELATION TECHNIQUES

The present invention relates to correlation techniques, and it relates especially, although not exclusively, to such techniques for use in correlating television or infra-red pictures of a scene, obtained at different times, for example for the purpose of effecting auto-lock-follow (or briefly A.L.F.) in a guided missile arrangement.

It is known to effect A.L.F. by storing a reference picture, or a part thereof, for comparison with subsequently derived pictures of the same scene. The reference picture, or part thereof, is compared with another picture in each of several relative positions so as to determine the relative position at which maximum correlation between the two pictures occurs. An indication of the aforementioned position of maximum correlation is used to steer the missile towards its target.

Conventional A.L.F. systems employ sophisticated correlation techniques. For example, use may be made of fast fourier transforms or comparisons may be made on a picture point-by-picture point basis. These techniques tend to be complicated and expensive to implement and yet can be adversely affected by noise in the pictures.

It is an object of this invention to provide a relatively simple correlation technique which gives good correlation performance and provides adequate signal-to-noise performance.

This invention embodies a novel principle, namely that of performing correlation between first and second pictures on the basis of line integrals taken through both sets of picture data.

According to the invention there is provided a correlation arrangement comprising means for deriving line integrals of data relating to a first two-dimensional representation of a scene, means for deriving corresponding line integrals of data relating to a second two-dimensional representation of substantially the same scene, and means for comparing corresponding ones of said line integrals to ascertain a correlation between said representations.

Figure 2:
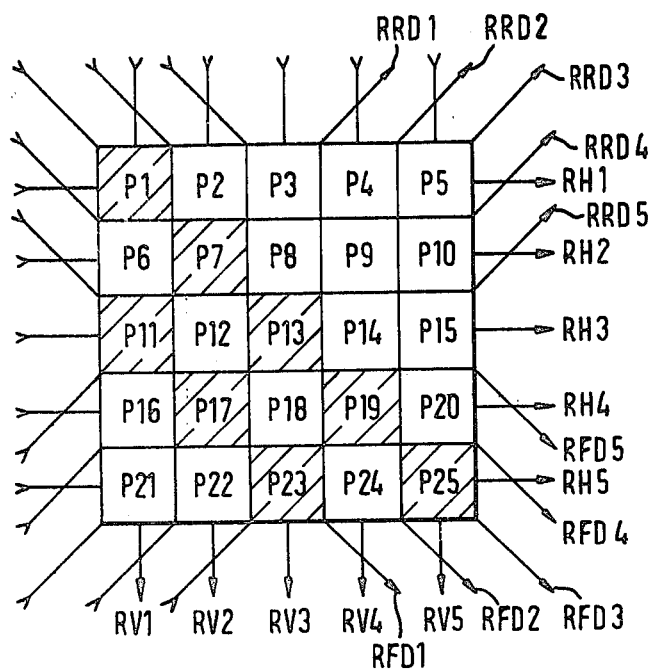
Figure 3:
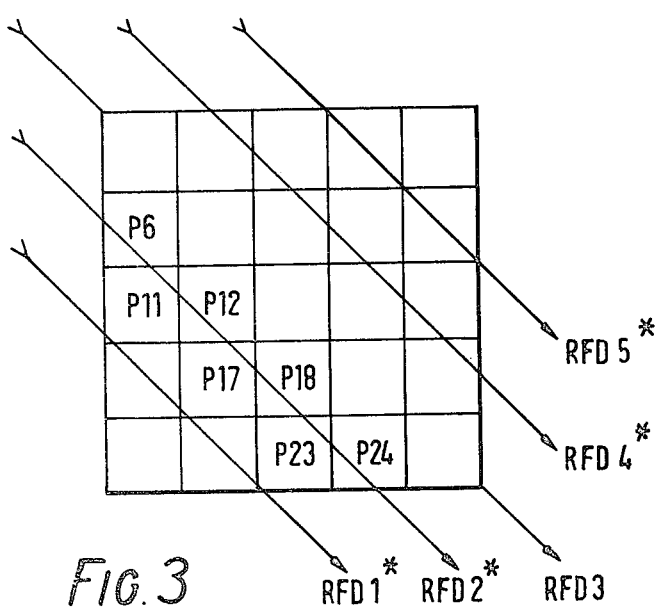
Figure 4:
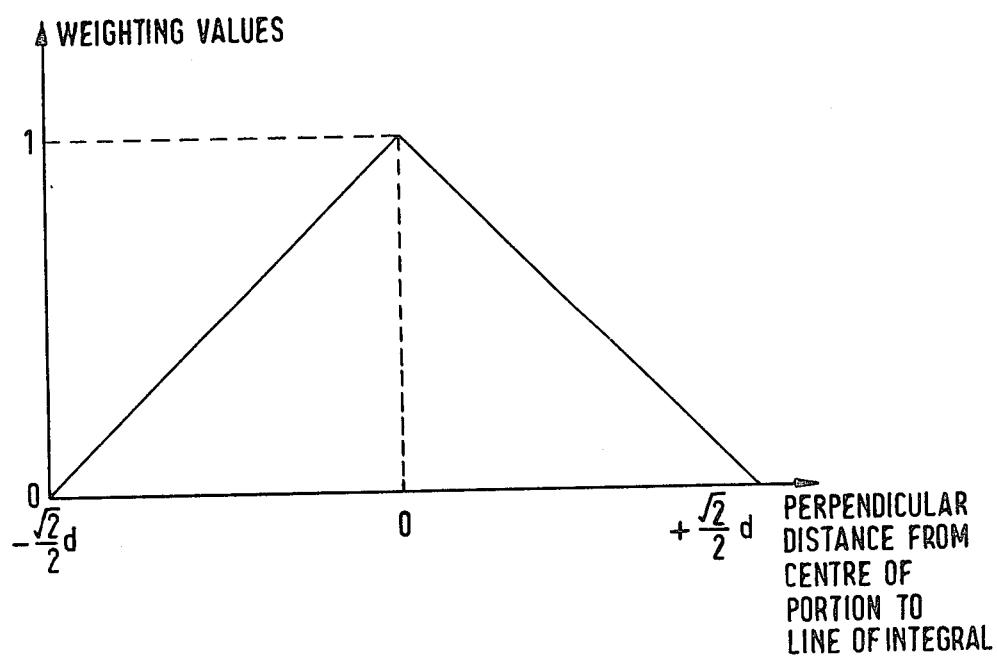

In order that the invention may be clearly understood and readily carried into effect, one embodiment thereof will now be described, by way of example only, with reference to the accompanying drawings, of which:

FIG. 1 shows in block diagrammatic form an arrangement in accordance with one example of the invention, FIGS. 2 and 3 show a matrix used in explaining the invention, and FIG. 4 shows a weighting function which can be employed in one example of the invention.

Referring now to FIG. 1, scene data signals derived, for example, from a low light television camera are converted, in known manner to digital signals. The digitised data are routed, by a commutator 1 of known kind, either to a reference picture store 2 or to a current picture store 3. The commutator, as is well known, is operated under the control of a master timing circuit 4, as indicated by the dashed line interconnecting commutator 1 and circuit 4. The timing circuit 4 also controls the operation of other components included in the correlation arrangement; the interconnections of all relevant components with the timing circuit being shown in dashed lines for purposes of clarity.

A region of interest in the scene is initially selected by an operator who views a console (not shown) at which the television picture is displayed and operates a selector panel 5 to select said region of interest. In one example, the store 2 contains a storage element for each portion (or picture element) of the viewed scene in respect of which a digital signal is produced, and the selected region of interest comprises, for example, a patch of 32×32 portions. Once designated, this patch becomes the subject of the auto-lock-follow process.

Once the initial picture has been read into the reference picture store 2, selected pictures, i.e. frames of the television picture data, are applied to the current picture store 3 where they are stored, one at a time, in digital form.

The correlation between the reference picture held in store 2 and the current picture held in store 3 is effected, in accordance with the principle of this invention, on the basis of line integrals of the stored digital data.

Considering first the operation of the store 2 and its ancillary circuits, an address selector 6 is operated under the control of the selector panel 5 and of the timing circuit 4 to read out the stored values along lines through the selected patch as indicated, for example, in FIG. 2. A patch of only twenty-five portions P1 to P25 is indicated in FIG. 2 for ease of illustration, but it will be evident that in practice the patch will contain 1024 portions if a 32×32 matrix is used. The address circuit reads out first the data stored in all of the portions disposed in the top horizontal row of the patch, i.e. the data for P1, P2, P3, P4 and P5 in this example. These values are summed in a summing circuit 7 to produce a line integral value RH1 representing the total of the data stored in the first horizontal row of the reference patch. Similar line integrals RH2 to RH5 are produced for the remaining rows of the patch.

Likewise, line integral values RV1 to RV5 are produced in respect of the five columns of the patch. It will be appreciated that, for example, line integral value RV1 is given by the sum P1+P6+P11+P16+P21.

Rising and falling diagonal line integrals are also constructed, for example the five rising diagonal line integrals are:

$RRD\ 1 = P11 + P7 + P3$ $RRD\ 2 = P16 + P12 + P8 + P4$ $RRD\ 3 = P21 + P17 + P13 + P9 + P5$ $RRD\ 4 = P22 + P18 + P14 + P10$ $RRD\ 5 = P23 + P19 + P15$

It will be observed that some of these line integrals contain more component values than others, but this is not significant bearing in mind that the line integrals in question are to be compared with similarly constructed line integrals derived from the current store 3.

The construction of the falling diagonal line integrals will be evident from the foregoing, but for completeness the list of five falling diagonal line integrals actually used in this example is as follows:

$RFD\ 1 = P11 + P17 + P23$ $RFD\ 2 = P6 + P12 + P18 + P24$ $RFD\ 3 = P1 + P7 + P13 + P19 + P25$ $$RFD\ 4 = P2 + P8 + P14 + P20$$

$$RFD\ 5 = P3 + P9 + P15$$

These line integral values (twenty of them in this example) constituted by RH1 to RH5, RV1 to RV5, RRD1 to RRD5, and RFD1 to RFD5, are stored in a reference line integral store 8. Once having been thus stored, the reference line integrals are repeatedly read out, in a predetermined sequence, for comparison in a digital subtraction circuit 9 with corresponding line integral values derived from the data currently held in the current picture store 3. The data for comparison is derived from the current store 3 under the control of an address selector circuit 10, and it is first derived from a region of the store 3 which, on the basis of the position co-ordinates of the patch selected as the reference patch, is likely, in the absence of relative shift of the reference picture and the current picture, to give the best correlation with the values held in the store 8. The selected region is, of course, a patch of 32×32 portions, like the reference patch, so that the magnitudes of the line integrals derived therefrom should, if no shift has occurred between the receipt of the current and reference pictures, be the same as those of the corresponding line integrals derived from the reference patch. Thus, under circumstances of ideal registration between the reference patch and the current patch, the output of the subtraction circuit 9 should be zero for all twenty subtractions of current patch data from corresponding line integral data.

The twenty output signals, representing the results of the twenty subtractions, are summed in a summing circuit 11 and the sum is stored in a digital store 12.

A different patch in the current picture store (for example one displaced by one row and/or one column from the original patch) is then selected by the address circuits 10 and twenty new line integrals relating to the newly selected patch are generated and compared in subtracting circuit 9 with the reference line integrals held in the store 8. This procedure is repeated for several different patches of the data held in the current picture store and the various sums provided by the circuit 11 are stored in the store 12. When a sufficient number (say twenty) of patches of the current picture have been correlated with the reference patch, a best fit selector 13 of a kind well known in the pattern recognition art, is arranged to select the lowest sum from the store 12 and to feed information concerning the storage location, in store 12, of the selected sum, to a co-ordinate analyser 14 which takes account of the position, relative to the current data, of the patch which gave the best correlation (lowest sum) with the reference patch to derive control information for causing a missile carrying the low light television camera to steer towards the selected target.

Once the relative shift between the reference picture and the current picture has been established, the effects of rotation of the missile can be allowed for by effectively rotating the patch in the current picture, about its centre point as determined by the correlation procedure described above, relative to the reference patch. This can be done in rudimentary form by comparing the rising diagonal line integrals of the best fit current patch with the horizontal line integrals of the reference patch, the vertical line integrals of said current patch with the rising diagonal line integrals of the reference patch, the falling diagonal line integrals of the current patch with the vertical line integrals of the reference patch and the horizontal line integrals of the current patch with the falling diagonal line integrals of the current patch. This provides twenty line integral comparisons, as before, but allowance has to be made for the fact that in this case some line integrals will contain more values than those with which they are to be compared.

A second set of twenty comparisons can be made by comparing the horizontal line integrals of the reference patch with the vertical line integrals of the current patch, and vice-versa, and by comparing the rising line integrals of the reference patch with the falling line integrals of the current patch, and vice-versa. In this case all line integrals compared will contain the same number of values and thus no compensation is required.

Finally, a third set of twenty comparisons can be made by comparing the falling diagonal line integrals of the current patch with the horizontal line integrals of the reference patch, the horizontal line integrals of the current patch with the rising diagonals of the reference patch, the rising diagonals of the current patch with the vertical line integrals of the patch and the vertical line integrals of the current patch with the falling diagonal line integrals of the reference patch. The best fit selector 13 then selects the lowest total out of four rotation values stored in store 12 (i.e. the original comparison with the three rotated comparison values obtained as described above) to ascertain the best fit and thus the roll of the missile.

If desired, of course, angles of rotation of less than 45° can be allowed for by taking less sharply angled line integrals through the current patch.

In the case where the best fit selector 12 selects a value which is above a threshold level, representing a poor degree of correlation, circuits can be provided, if desired, to inhibit the selection of a best fit patch in the current store and to cause further comparisons to be made in an attempt to find a better patch correlation and/or to up-date the reference picture. This applies primarily when the selector is operating on values obtained by simple shifts of the current patch relative to the store 3.

As described hereinbefore, and as shown in FIG. 2, the diagonal line integrals are assembled on the basis of the portions P the centres of which are intersected by the line in question. The portions so intersected by the lines RFD1 and RFD3 are shown shaded in FIG. 2. In some circumstances, it may be desired to bring other portions into some or all of the line integrals. For example, as shown in FIG. 3, the line RFD3 is the same as that shown in FIG. 2, however the other lines RFD are disposed so that their perpendicular distances from their nearest neighbours are the same as the corresponding distances for the RH and RV lines. It will be appreciated that this is not the case in the arrangement of FIG. 2.

Considering the line RFD 2* in FIG. 3, it will be seen that it passes through the seven portions P6, P11, P12, P17, P18, P23 and P24 but that is passes closer to the centres of some portions (i.e. P6, P12, P18 and P24 than to the centres of other portions (i.e. P11, P17 and P23. In constructing the line integral for RFD2*, therefore, it is desirable (though not necessary) to give the contributions from portions P6, P12, P18 and P24 more weight than the contributions from portions P11, P17 and P23. This can be achieved on the basis of (for example) a triangular waveform, as shown in FIG. 4, of weighting values, where a weight of unity is applied if the line along which the integral is to be constructed passes exactly through the centre of a portion and reduced weights are applied as the perpendicular distance from the centre of a portion to the line in question increases; the weight becoming zero when the perpendicular distance is $\sqrt{2}/2$ d, where d is the dimension of the side of a portion.

Clearly, the manner in which the line integrals are constructed is of little significance provided that the same rules are applied in constructing the line integrals for the reference picture as for the current picture. The arrangement is thus extremely flexible, and the most convenient method of constructing line integrals can be employed in any given case.

While the system shown in FIG. 1 can be constructed in hard wired form using known circuits, some portions of the system, such as the digital stores 2 and 3, the address selector 6 and 10, the reference line integral store 8, the store 12 and the components 13 and 14, together with the master timing circuit 4, can be constituted by a suitably programmed digital computer.

What I claim is:

1. A correlation arrangement comprising storage means containing storage locations for storing data relating to first and second two-dimensional representations of substantially the same scene, selector means for selecting data from groups of said storage locations, each group containing data relating to a respective substantially linear region of one or other of said representations, means for individually combining the data selected from each group to produce respective combination signals, means for comparing pairs of combination signals relating to corresponding regions of the first and second representations to form respective comparison signals indicative of the degree of similarity between each compared pair of combination signals, means for operating on the comparison signals to produce a correlation signal indicative of the extent to which said first and second representations resemble each other, means for effectively shifting the position of one of the representations relative to the other and for producing a respective correlation signal for each relative position adopted by said one representation in relation to the other, and means for selecting the correlation signal which indicates the closest resemblance of said first and second representations to one another.

2. An arrangement according to claim 1 including means for generating a control signal in dependence upon the relative dispositions of said representations corresponding to the selected one of said correlation signals.

3. An arrangement according to claim 2 including means for inhibiting the production of said control signal in the event that said selected correlation signal does not satisfy a criterion indicative of a predetermined degree of resemblance between said representations.

4. An arrangement according to claim 1 further including means, effective with the representations in the relative position giving rise to the selected correlation signal, to effectively rotate one of said representations through a plurality of selected angles relative to one another and to produce a respective angular correlation signal for each of said selected angles, and means for selecting the angular correlation signal indicative of closest resemblance of the representations to one another.

5. A correlation arrangement comprising means for deriving line integrals of data relating to a first two-dimensional representation of a scene, means for deriving corresponding line integrals of data relating to a second two-dimensional representation of substantially the same scene, means for comparing corresponding ones of said line integrals to ascertain a correlation between said representations, respective storage means for storing data relating to said first and second two-dimensional representations of said scene, selector means for selecting data from corresponding groups of storage locations in the storage means for each of said representations, means for individually combining the data selected from each of said storage means to produce respective combination signals, means for comparing the combination signals to produce a comparison signal indicative of the degree of similarity between the combination signals, means for producing respective comparison signals for data selected from a plurality of other groups of said storage locations and means for summing all of said comparison signals to produce a correlation signal indicative of the extent to which said first and second representations resemble each other; the arrangement further including means for effectively shifting the position of one of the representations relative to the other and the arrangement being such as to produce a respective correlation signal for each relative position adopted by said one representation in relation to the other.

6. An arrangement according to claim 5 including means for selecting that one of said correlation signals which is indicative of the closest resemblance of said first and second representations to one another.

7. An arrangement according to claim 6 including means for generating a control signal in dependence upon the relative dispositions of said representations corresponding to the selected one of said correlation signals.

8. An arrangement according to claim 7 including means for inhibiting the production of said control signal in the event that said selected correlation signal does not satisfy a criterion indicative of a predetermined degree of resemblance between said representations.

* * * * *